March 7, 1967 — F. O. LUENBERGER — 3,307,663
ANTI-CREEP DEVICE FOR VARIABLE RATIO TRANSMISSIONS OR THE LIKE
Filed Feb. 8, 1965
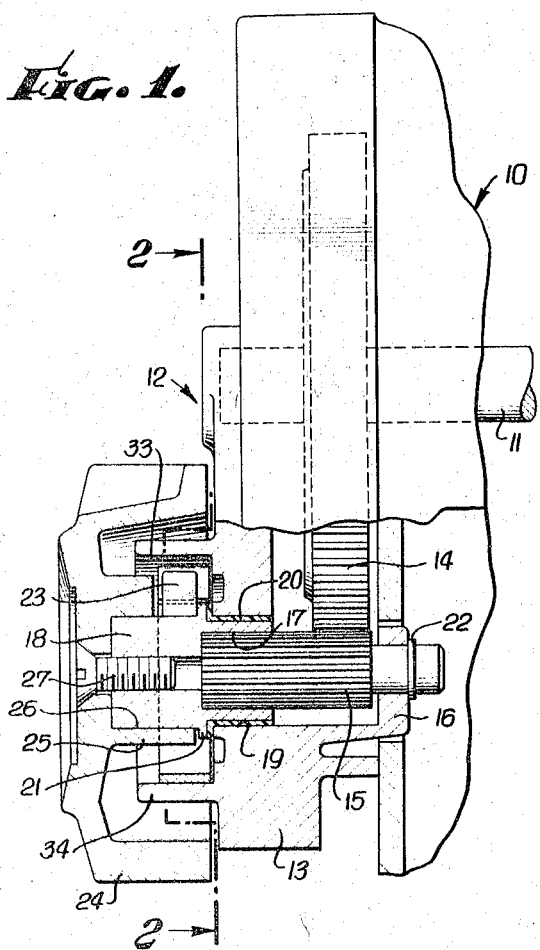
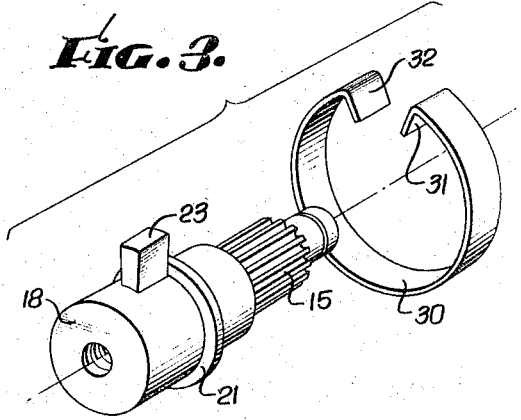
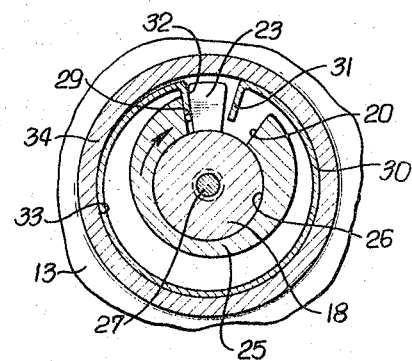
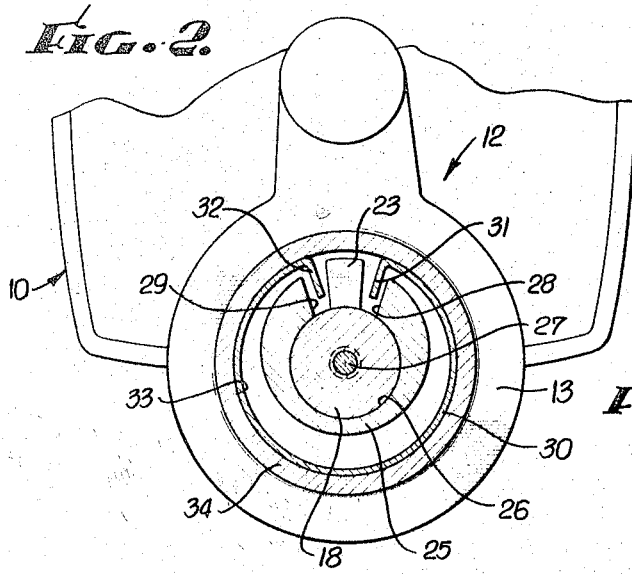
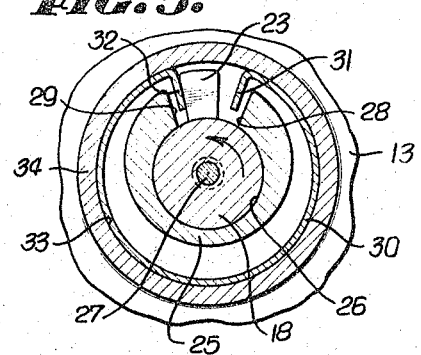
FREDERICK O. LUENBERGER
INVENTOR.
by Flam and Flam
ATTORNEYS.

United States Patent Office 3,307,663
Patented Mar. 7, 1967

3,307,663
ANTI-CREEP DEVICE FOR VARIABLE RATIO TRANSMISSIONS OR THE LIKE
Frederick O. Luenberger, Los Angeles, Calif., assignor to Emerson Electric Co., St. Louis, Mo., a corporation of Missouri
Filed Feb. 8, 1965, Ser. No. 431,038
1 Claim. (Cl. 192—8)

This invention relates to an anti-creep device intended to secure a shaft or other angularly movable element in an adjusted position. The invention is particularly applicable to adjusting mechanisms for variable ratio transmissions whereby the forces of vibration, and the like, tending to disrupt the adjustment, are effectively resisted. A device of this general character is disclosed in United States Letters Patent No. 2,973,070, issued to U.S. Electrical Motors Inc. on February 28, 1961.

In said prior patent, the shaft to be adjusted carries a special cam member in which a pair of rollers are accommodated. Springs normally urge the rollers to bind against a fixed cylindrical surface; one of the rollers stops creeping movement of the shaft in one direction, and the other stops creeping movement in the other direction. A handle carries an operating projection. As the handle is moved in either direction, the projection first releases the corresponding roller, and then moves the shaft.

The primary object of this invention is to provide an automatically releasable locking mechanism of this character that is materially simplified. For this purpose, use is made of an arcuate braking member made of strip spring stock material with ends bent to define two complementary angularly extending spaces. The driving and driven members have parts extending respectively in these spaces. The arcuate spring normally engages a non-rotary cylindrical braking surface. If the driven member or shaft tends to creep, one end or the other of the spring is engaged, causing the spring to bind against the cylindrical surface. However, when the driving member or handle is moved, its part first releases the spring and then moves the shaft.

Another object of this invention is to provide a device of this character that is extremely delicate such that it offers negligible resistance to normal movement of the knob or handle, but which is yet fully effective to restrain creeping movement of the adjusted member. For this purpose, the spring is designed so that it only very lightly engages the cylindrical surface; the increased pressure is caused only by creeping movement of the shaft. Strong compression springs are unnecessary.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claim.

Referring to the drawings:
FIGURE 1 is an axial sectional view of an anti-creep device incorporating the present invention, a fragmentary part of the mechanism in which the device is installed being also illustrated;
FIG. 2 is a sectional view taken along a plane corresponding to line 2—2 of FIG. 1;
FIG. 3 is an exploded view of the driving pinion assembly and wrap up spring; and
FIGS. 4 and 5 are sectional views similar to FIG. 2, but illustrating the operation of the wrap up spring as the knob is rotated, and as the pinion assembly tends to creep.

In FIG. 1 there is illustrated a variable ratio transmission case 10 in which adjustable diameter pulley structures (not shown) may be accommodated. In order to adjust the effective diameter of the pulley structures, a shaft 11 is angularly positioned. One manner in which this may be accomplished is described, for example, in my copending application, Serial No. 324,802, filed November 19, 1963 (now Patent Number 3,250,141) and entitled Variable Ratio Transmission Mechanism.

Attached to the side of the transmission case 10 is a control unit 12. The control unit 12 includes a hollow casting 13 that provides a suitable bearing for the outer end of the shaft 11. The shaft 11 carries a gear 14 that is moved by a pinion 15. One end of the pinion 15 is reduced and is received in an apertured arm 16 of the casting 13. The other end of the shaft fits into a splined recess 17 of an actuator 18. The actuator, in turn is mounted at a frontal bearing aperture 19 of the casting 13.

A plastic bushing 20 lines the bearing aperture 19. The actuator 18 has a peripheral flange 21 that defines the limit to inward movement of the actuator. A locking ring 22 mounted on the reduced extension of the pinion 15 engages behind the wall 16 and thus limits outward movement of the pinion assembly.

The actuator 18 has a radially extending abutment or rib 23 by the aid of which the pinion assembly is angularly moved. A knob or handle 24 journalled on the outer end of the actuator 18 moves the abutment or rib 23. The knob 24 is in this instance, of cup like configuration, having a central hub 25 provided with a cylindrical recess 26 that fits over the actuator 18. A screw 27 holds the handle or knob 24 on the actuator, but allows relative angular movement therebetween.

The hub 25 has a notch defining opposed wall surfaces 28 and 29. The projection 23 is received with clearance in the notch 28–29 whereby a lost motion connection is provided between the knob and the actuator. Accordingly, upon movement of the knob 24 in either direction, the pinion assembly 18, 15 is angularly moved after the clearance or lost motion is taken up.

An arcuate braking member or band 30 is designed to prevent creeping movement of the pinion assembly. This brake band is made of strip spring stock material, such as Phosphor bronze. The ends 31 and 32 of the band 30 are inwardly bent substantially at right angles to the band. The band 30 is fitted in a cylindrical recess 33 formed by a flange 34 of the casting 13. The flange 34 projects with clearance about the actuator 18 and the knob hub 25. The bent ends 31 and 32 of the band 30 project into the notch 28–29 on opposite sides of the actuator projection 23. The spacing between the spring ends 31 and 32 just slightly exceeds the thickness of the projection 23. The spring 30 in its unflexed state preferably has a curvature just slightly less than that of the cylindrical recess 33 whereby the spring 30 normally quite delicately grips the flange 34.

When the knob or driving member 24 is moved (FIG. 4) for example in a clockwise direction, the notch surface 29 first engages the spring end 32. The force so applied tends to move the corresponding end of the spring inwardly; the spring 30 is thus released for movement with the hub 25. The rib 23 of the actuator or driven member 18 is thereupon engaged and the pinion assembly is moved and the transmission ratio is adjusted. The same operation results upon counterclockwise movement of the knob, but in this case the notch surface 28 releases the spring by engaging the end 31. Since the spring 30 grabs the flange 34 with only slight force, there is no substantial resistance to turning imposed on the handle or knob 24.

If the pinion assembly tends to creep in either direction, the spring 30 operates to restrain such movement. Thus (FIG. 5) the projection or rib 23 engages one of the spring ends 31 or 32. The force so applied tends to move the spring end outwardly against the recess 33, and the spring binds up, and restrains further movement of the pinion assembly.

The inventor claims:

In apparatus for maintaining angular adjustment of rotary mechanisms: a case having a frontal aperture; a bearing in the case aligned with but spaced inwardly of said frontal aperture; a pinion having an inner end supported by said bearing; an actuator secured to the outer end of said pinion and having an external annular bearing surface; a bearing sleeve accommodated at said frontal aperture and supporting said actuator and thereby said pinion by engagement with the said annular bearing surface; said actuator having a part projecting outwardly of said case; said actuator having a radially extending abutment for transmission of angular movement to said pinion; a knob journalled on the outer end of said actuator and having an integral inner hub portion fitting over the actuator, said hub portion having a notch defining opposed wall surfaces between which said radially extending abutment is received with clearance; said case having annular wall means providing a cylindrical surface circumscribing said hub portion and said radially extending abutment; a brake band made of spring stock material fitted in the recess and having a normal curvature slightly less than that of said circumscribing cylindrical recess; said brake band having inwardly bent ends respectively interposed between said wall surfaces and said radially extending abutment on opposite sides of said radially extending abutment; said knob being supported for rotation only by said actuator whereby said knob may be removed without disturbing the support of said pinion and said actuator; angular movement of said knob in either direction causing release of said band from said cylindrical surface and movement of said radial projection and said pinion; movement of said pinion in either direction without application of a driving torque from said knob causing movement of said band into locking engagement with said cylindrical surface.

References Cited by the Examiner

UNITED STATES PATENTS

| 1,537,223 | 5/1925 | Clas | 192—8 |
| 1,629,277 | 5/1927 | Koeb | 192—8 |
| 3,250,141 | 5/1966 | Luenberger | 74—230.17 |

DAVID J. WILLIAMOWSKY, *Primary Examiner.*

BENJAMIN W. WYCHE, III, *Examiner.*